United States Patent [19]

Hanson et al.

[11] Patent Number: 4,831,469

[45] Date of Patent: May 16, 1989

[54] DISK DRIVE HEAD RETRACT AND MOTOR BRAKING METHOD AND APPARATUS

[75] Inventors: Charles C. Hanson, Pine Island; Michael J. Ross, Rochester, both of Minn.

[73] Assignee: International Business Machines Corporation, Armonk, N.Y.

[21] Appl. No.: 79,302

[22] Filed: Jul. 29, 1987

[51] Int. Cl.⁴ .............................................. G11B 5/54
[52] U.S. Cl. ................................... 360/75; 318/254; 318/376
[58] Field of Search ................... 360/75, 105; 318/254, 318/376

[56] References Cited

U.S. PATENT DOCUMENTS

| | | | |
|---|---|---|---|
| 2,858,494 | 10/1958 | Choudhury | 318/212 |
| 3,271,649 | 9/1966 | Juergensen | 318/376 |
| 3,518,651 | 6/1970 | Keeney | 360/75 |
| 3,548,275 | 12/1970 | Inagaki et al. | 318/211 |
| 3,648,263 | 3/1972 | Kunstadt | 340/174.1 E |
| 4,139,874 | 2/1979 | Shiraishi | 360/75 |
| 4,237,501 | 12/1980 | Barmache et al. | 360/75 |
| 4,311,948 | 1/1982 | Brown et al. | 318/759 |
| 4,371,903 | 2/1983 | Lewis | 360/75 |
| 4,481,449 | 11/1984 | Rodal | 318/375 |
| 4,494,056 | 1/1985 | Nishijima et al. | 318/269 |
| 4,494,058 | 1/1985 | Berti | 318/372 |
| 4,496,894 | 1/1985 | Petersen | 318/759 |
| 4,658,308 | 4/1987 | Sander, Jr. | 360/74.1 |
| 4,679,102 | 7/1987 | Werens et al. | 360/75 |
| 4,751,595 | 6/1988 | Kishi et al. | 360/75 |

FOREIGN PATENT DOCUMENTS

| | | |
|---|---|---|
| 58-45670 | 3/1983 | Japan . |
| 59-71089 | 9/1984 | Japan . |
| 59-198574 | 11/1984 | Japan . |
| 60-138788 | 7/1985 | Japan . |
| 60-167170 | 8/1985 | Japan . |
| 61-168183 | 7/1986 | Japan . |
| 61-170965 | 8/1986 | Japan . |
| 2187031 | 8/1987 | United Kingdom . |

Primary Examiner—Aristotelis M. Psitos
Assistant Examiner—David L. Robertson
Attorney, Agent, or Firm—Curtis G. Rose

[57] ABSTRACT

One phase of a multi-phase spindle motor, normally used to rotate the disk of a disk drive system when power is on, is used to supply power to a capacitor storage circuit when power is lost (turned off or otherwise interrupted). The capacitor storage circuit provides the power to the retract circuit, which retracts the head. The combination of the generator effect of the phase and the capacitor storage circuit provides power to the retract circuit for a time clearly sufficient to reliably retract and lock the head regardless of the bias of the head prior to power loss.

Simultaneously with one phase being used to retract the head, the other phases are shorted together to provide regenerative braking. FET drivers, normally used to drive the spindle motor when power is supplied, are used to short out the remaining phases to brake the motor when power is lost.

In the preferred embodiment, the capacitor storage circuit is used as a line filter circuit when power is on. Therefore, the major circuit components used for retracting the head and braking the motor upon loss of power (capacitor storage circuit, motor windings, FET drivers) are all used for different purposes when power is on. This efficient use of the same circuitry for multiple purposes results in an efficient, reliable, compact, and relatively inexpensive approach for disk drive head retract and motor braking upon loss of power.

13 Claims, 5 Drawing Sheets

DISK DRIVE HEAD RETRACT AND MOTOR BRAKING METHOD AND APPARATUS

FIELD OF THE INVENTION

This invention relates to a method and apparatus for retracting the head and braking the motor of a disk drive upon a loss of power. More particularly, this invention performs these steps simultaneously and in an efficient and low cost manner.

DESCRIPTION OF THE RELATED ART

During a power down or power interruption condition, the disk drive device has two primary functions it must perform. One primary function is to retract the head (or heads) of the disk drive to an area of the disk pack designated as a head landing area. This is to prevent the head from landing in a data area and destroying data. Once the head is in the head landing area, it must be forcibly held up against the head stop so it doesn't drift back over into the data area due to the forces created by the still spinning disk and the mechanical bias from the actuator cable. The head must be held up against the head stop long enough to allow time for a latch to secure the head in place. Therefore, sufficient power must be provided to the head retract circuit upon a loss of power to move the head into a safe, locked position, no matter where the head was before the power loss occurred. The worst case situation that must be accounted for is when the head is near the outer edge of the disk and rapidly accelerating outwards. Much power is required just to reverse the direction of the head, let alone move it back to a safe, locked position.

A second function that must be performed upon the loss of power is to brake the spindle motor to a stop. This is done to reduce the wear cycles on the head when it is dragging in contact with the media, after it has been locked in place.

Previous designs have used a separate dedicated generator winding in the brushless DC spindle motor or a large, dedicated capacitor to provide power to retract the head. The generator winding has the advantage of generating retract power for several seconds, necessary to reliably overcome the worst case situation described above. Using a separate generator winding has the disadvantages of using extra space and extra output lines, as well as extra cost. As disk drives become more compact and less expensive, these disadvantages loom large.

Capacitor storage also is disadvantageous, because a large capacitor is required to perform the necessary functions reliably. Large, dedicated capacitors add significantly to the cost and space requirements of the disk drive, and as a practical matter cannot provide retract power for more than a short period of time.

For the braking of the spindle motor, previous designs have used relays to short the windings of the brushless DC motor to brake the motor regeneratively. Using relays is costly and unreliable.

One prior art approach to solving the above problems was to allow the motor to coast after loss of power, use the EMF from all the windings to retract the head, and then, after a delay long enough to ensure the heads are in place, short out all the windings of the motor using the FET driver circuit to regeneratively brake the motor. Complex, expensive circuitry was required to implement this approach. Using all the windings for both the retracting and braking operations requires delay circuitry, costly both in extra circuit components needed and in extra time needed to complete both operations.

SUMMARY OF THE INVENTION

It is the principal object of this invention to provide an improved method and apparatus for retracting the head assembly and for braking the spindle motor that overcomes the disadvantages noted above.

It is another object of this invention to efficiently and reliably retract the head assembly and brake the spindle motor simultaneously upon indication of a loss of power.

These and other objects are accomplished by the circuitry disclosed herein. One phase of the multi-phase spindle motor, normally used to rotate the disk when power is on, is used to supply power to a capacitor storage circuit when power is lost. The capacitor storage circuit provides the power to the retract circuit, which retracts the head. The combination of the generator effect of the phase and the capacitor storage circuit provides power to the retract circuit for a time clearly sufficient to reliably retract and lock the head regardless of the bias of the head prior to power loss.

Simultaneously with one phase being used to retract the head, the other phases are shorted together to provide regenerative braking. FET drivers, normally used to drive the spindle motor when power is supplied, are used to short out the remaining phase to brake the motor when power is lost.

In the preferred embodiment, the capacitor storage circuit is used as a line filter circuit when power is on. Therefore, the major circuit components used for retracting the head and braking the motor upon loss of power (capacitor storage circuit, motor windings, FET drivers) are all used for different purposes when power is on. This efficient use of the same circuitry for multiple purposes results in an efficient, reliable, compact, and relatively inexpensive approach to solving the problems mentioned above.

BRIEF DESCRIPTION OF THE DRAWING

FIG. 3 shows a timing diagram of the operation of the circuitry of FIGS. 1 and 2 when power is on.

DESCRIPTION OF THE PREFERRED EMBODIMENT

Figure 1:
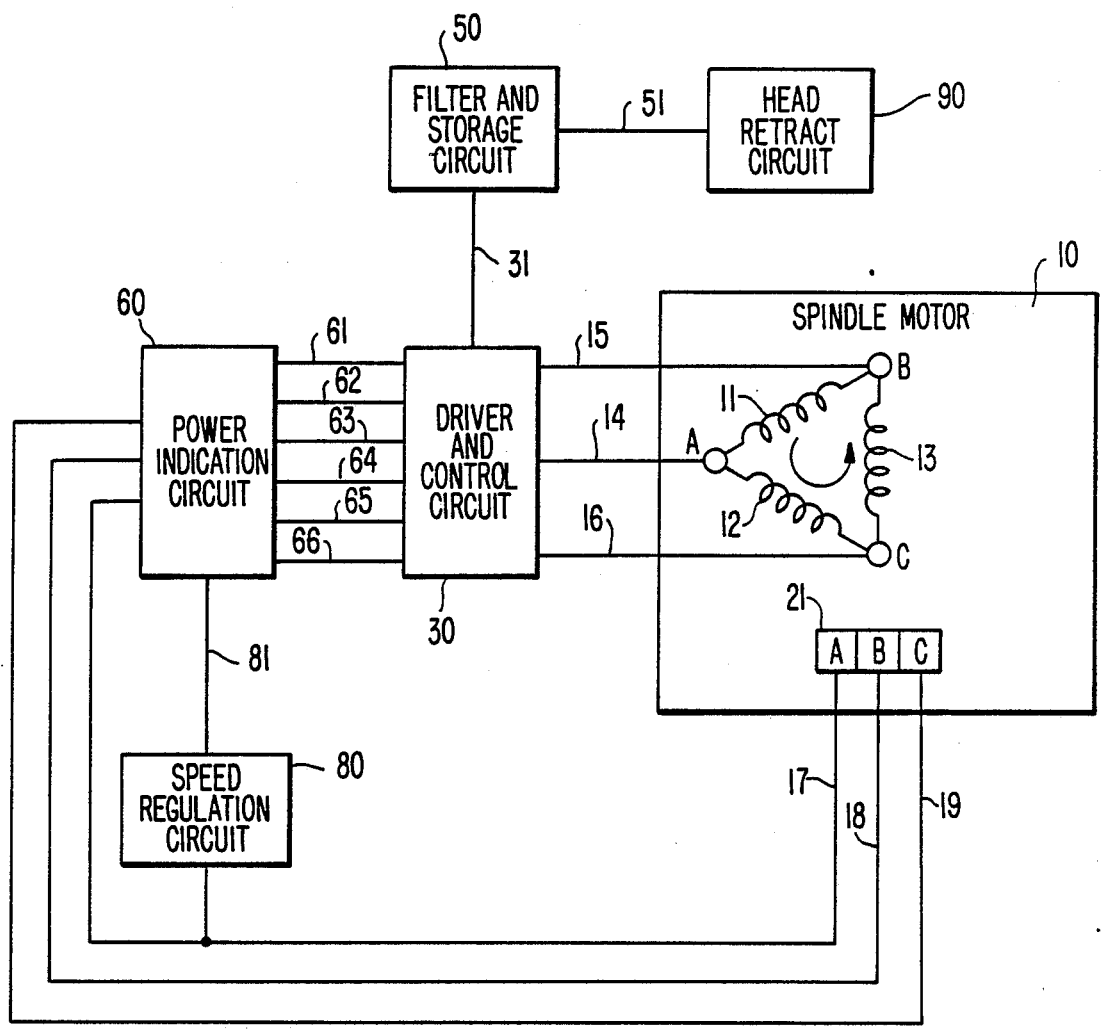
FIG. 1 shows a block diagram of the circuitry associated with the invention.

FIG. 1 shows an overall block diagram of the invention. Spindle motor 10 is shown as a three phase delta wound six pole DC brushless motor in the preferred embodiment, although a Y-wound motor or other types of motors could easily be substituted. Windings 11, 12, and 13 of motor 10 configured in a delta format make up phases A, B, and C, as shown.

When power indication circuit 60 senses power is on, lines 61–66 instruct driver and control circuit 30 to alternately provide power and speed control information to phases A, B, and C of motor 10 via lines 14, 15, and 16, respectively. In this matter, rotary motion of motor 10 is created, and the disk (not shown) attached to motor 10 spins. Hall sensors 21 on motor 10 provide rotor position information to power indication circuit 60 via lines 17, 18 and 19. Power indication circuit 60 uses this information to sequence motor 10 properly for rotational motion. In addition, line 17 is used to provide speed information to speed regulation circuit 80, which processes this information and passes it on to power indication circuit 60. Filter and storage circuit 50 provides filtered power to control circuit 30 to power the phases of motor 10.

When power indication circuit 60 senses power has been lost, lines 61–66 instruct control circuit 30 to use phase A as a generator to provide power to storage circuit 50 for use by head retract circuit 90 to retract the head of the disk drive. Simultaneous with this instruction, lines 61–66 instruct control circuit 30 to short phases B and C, thereby providing regenerative braking to motor 10.

Figure 2:
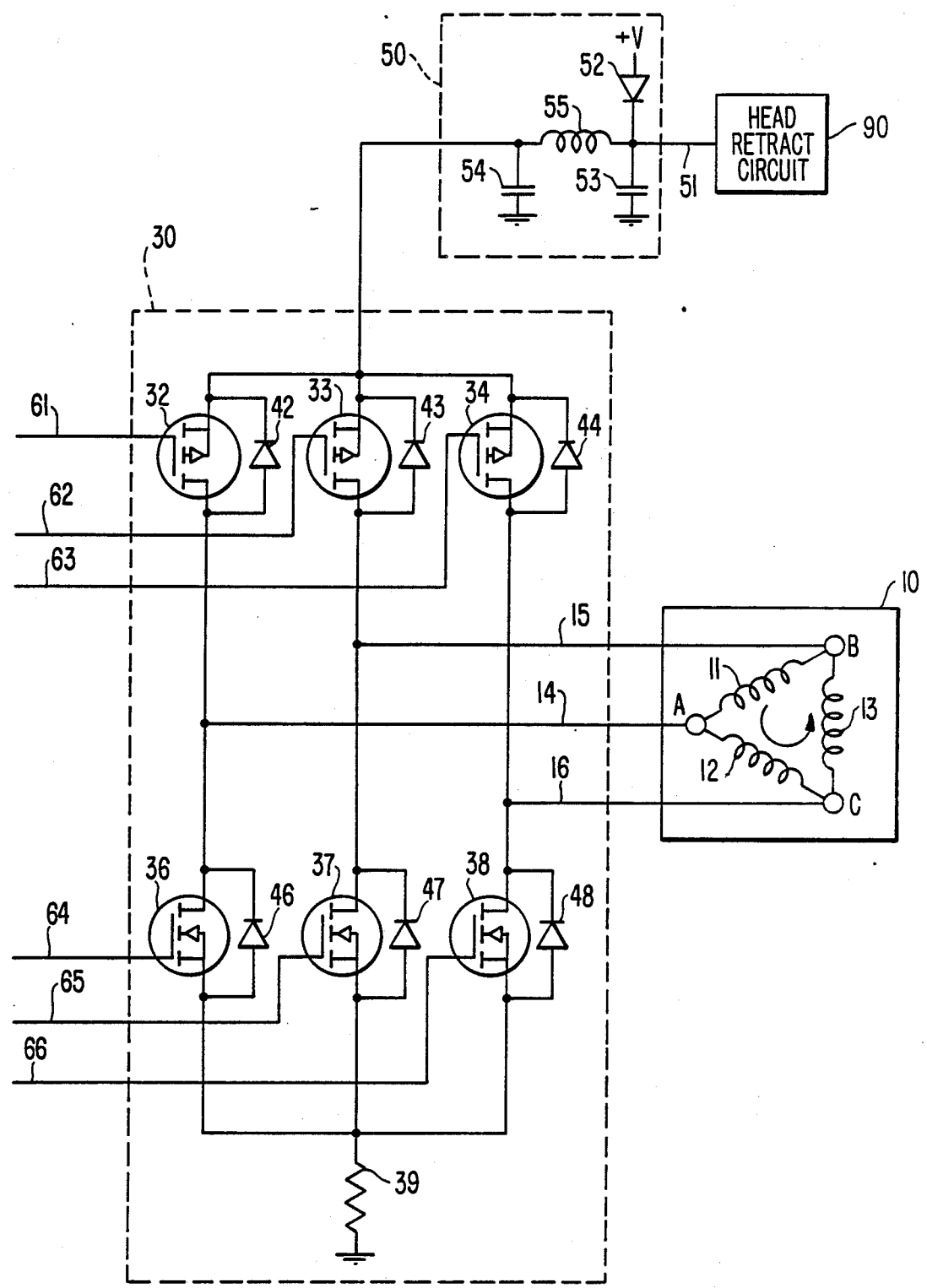
FIG. 2 shows the detail of the driver and control circuitry, and the detail of the filter and storage circuitry.

FIG. 2 shows control circuit 30 and storage circuit 50 in greater detail. Lines 61, 62, and 63 are connected to the gates of P-channel FETs 32, 33, and 34, respectively. Likewise, lines 64, 65, and 66 are connected to the gates of N-channel FETs 36, 37, and 38, respectfully. Diodes 42, 43, 44, 46, 47, and 48 are connected from drain to source of FETs 32, 33, 34, 36, 37, and 38, respectively. In the preferred embodiment, diodes 42, 43, 44, 46, 47, 48 are the internal body diodes of FETs 32, 33, 34, 36, 37, 38, respectively.

Storage circuit 50 is made up of diode 52, capacitors 53 and 54, and inductor 55.

Figure 3:
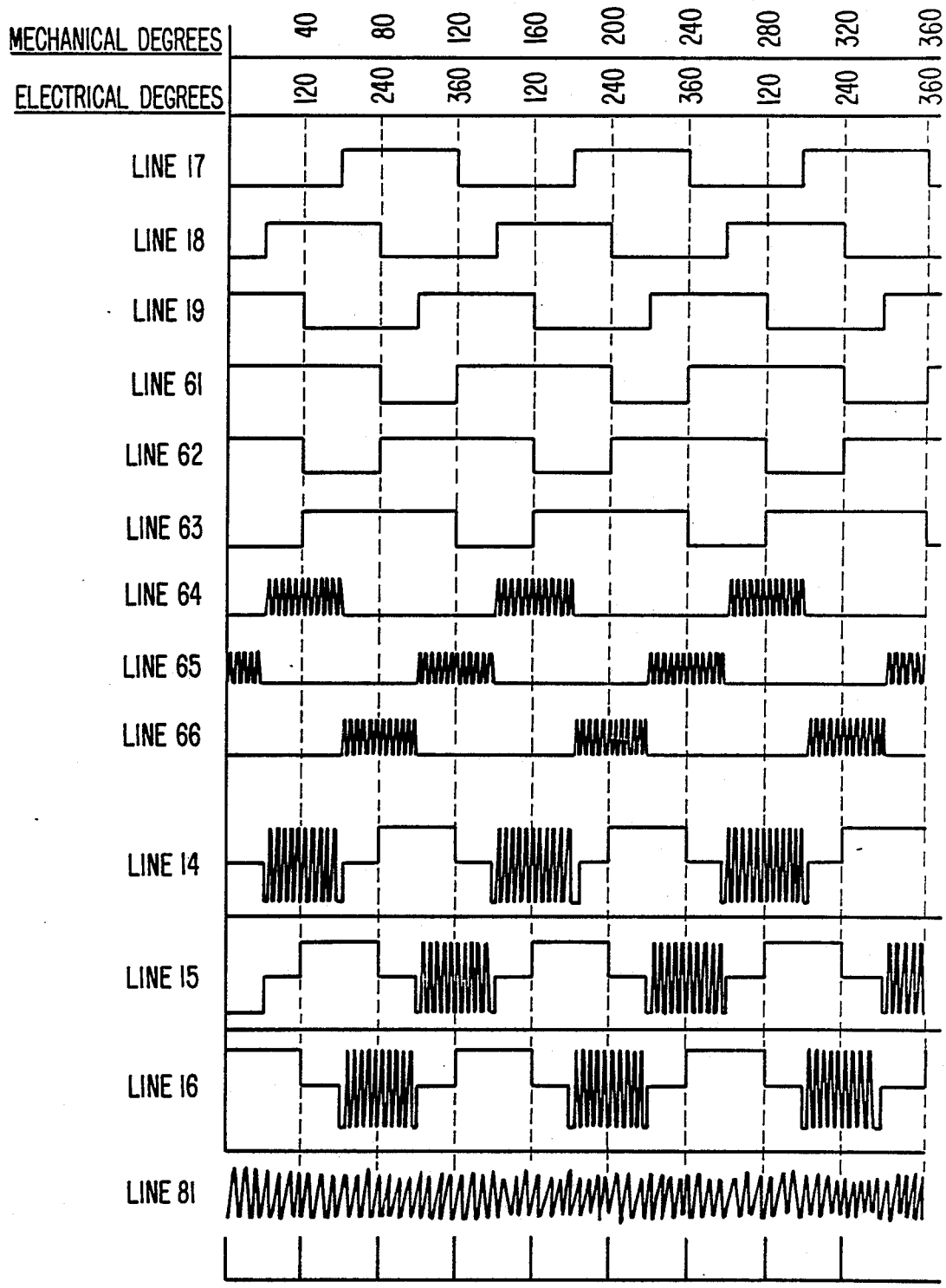

FIG. 3 shows a timing diagram of the operation of the circuitry shown in FIGS. 1 and 2 when power is on. Lines 17, 18 and 19 provide Hall rotational position information to power indication circuit 60. Indication circuit 60 uses this information to control the rotation of motor 10 via lines 61–66. Specifically, lines 61, 62, and 63 enable (switch on) FETs 32, 33, and 34 when they are low. As can be seen from FIG. 3, lines 61, 62, 63 are low ⅓ of the time, and are 120 electrical degrees out of phase with each other.

When line 61 is low, FET 32 is enabled. This allows voltage +V, filtered by the LC filter of capacitors 53 and 54 and inductor 55, to pass through FET 32 and provide power to phase A of motor 10 via line 14. Similarly, when line 62 is low, FET 33 is enabled, and a filtered +V passes through FET 33 and provides power to phase B of motor 10 via line 15. When line 63 is low, FET 34 is enabled, and a filtered +V passes through FET 34 and provides power to phase C of motor 10 via line 16. This sequential providing of power to phases A, B, and C of motor 10 accounts for the rotational motion of motor 10.

Indication circuit 60 receives speed regulation information from speed regulation circuit 80 via line 81. Speed regulation circuit 80 analyzes Hall information from line 17 in conjunction with a timer to determine the period of one revolution of motor 10. The time of one revolution is compared to a set point count of the desired revolutions per minute. The error between the set point time and the actual time of one revolution is used to form a pulse width modulated signal on line 81, as shown in FIG. 3.

Indication circuit 60 uses the pulse width modulated signal on line 81 to control the speed of motor 10. Specifically, lines 64, 65, and 66 enable FETs 36, 37 and 38 when they are high. As can be seen from FIG. 3, lines 64, 65, 66 are high ⅓ of the time, and are 120 electrical degrees out of phase with each other. Note also that line 64 is 90 electrical degrees out of phase with line 61, line 65 is 90 electrical degrees out of phase with line 62, and line 66 is 90 electrical degrees out of phase with line 63. Also note that lines 64, 65, and 66 are pulse width modulated based on information from line 81.

When line 64 is high, FET 36 is enabled. This allows the signal on line 64 to pass through FET 36 and provide speed control to phase A of motor 10 via line 14. Similarly, when line 65 is high, FET 37 is enabled, and the signal on line 65 passes through FET 37 and provides speed control to phase B of motor 10 via line 15. When line 66 is high, FET 38 is enabled, and the signal on line 66 passes through FET 38 and provides power to phase C of motor 10 via line 16. This periodic providing of speed control information to phases A, B, and C of motor 10 accounts for the maintenance of the proper speed of motor 10.

Therefore, as can be seen from FIG. 3, indication circuit 60 provides information on lines 61–66 to control circuit 30 that controls the rotation and speed of motor 10 when power is on. The signals on lines 14, 15, and 16 that connect to phases A, B, and C respectively of motor 10 are shown in FIG. 3.

When power indication circuit 60 senses a loss of power to the disk drive, the signals on lines 61–66 are considerably different than a normal power on condition shown in FIG. 3. Specifically, lines 61, 62, and 63 are held high, thus turning off FETs 32, 33, and 34. Line 64 is held low, turning off FET 36. Lines 65 and 66 are both held high, turning on FETs 37 and 38.

Figure 4:
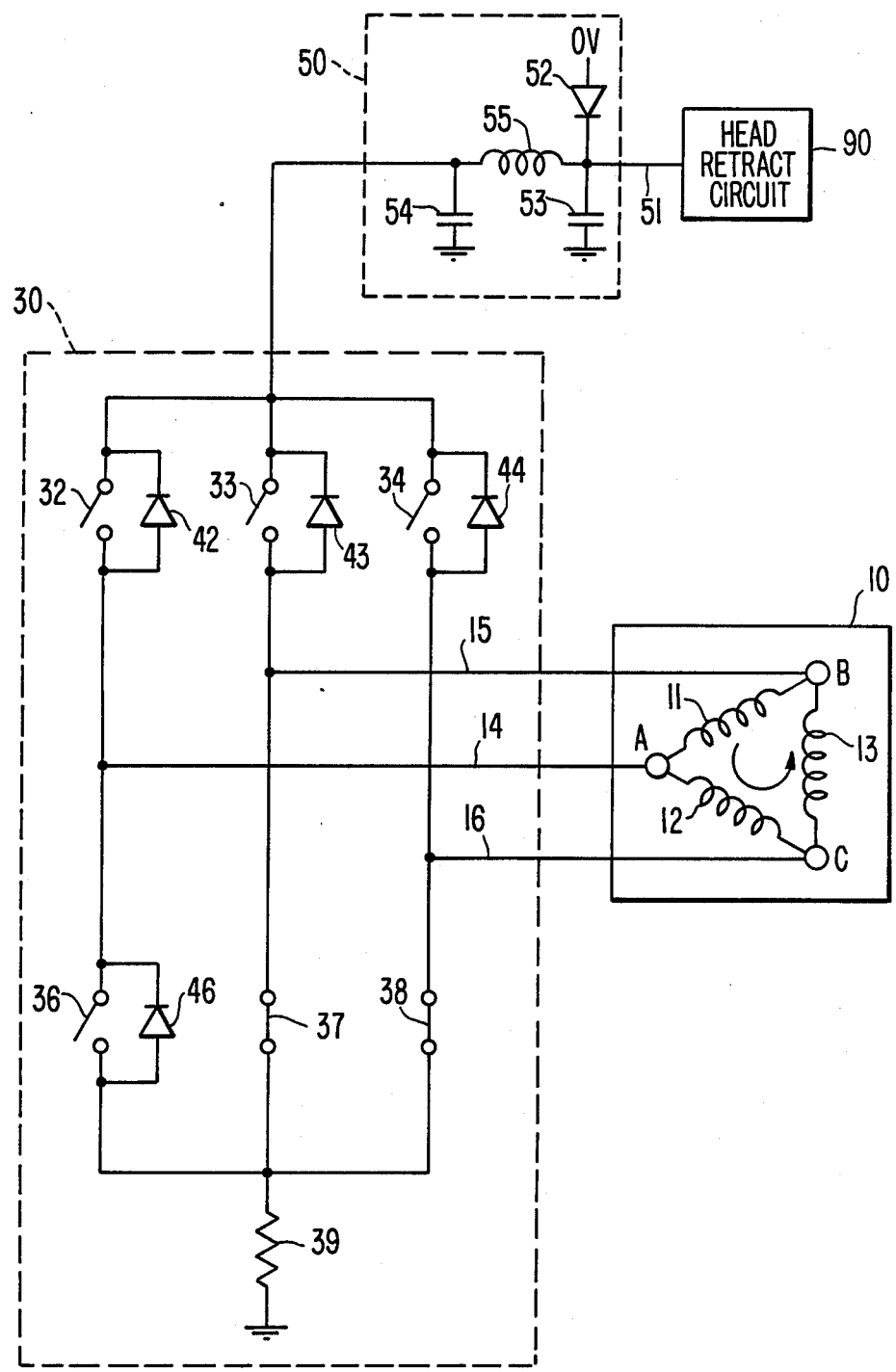
FIG. 4 shows a modellized circuit of the circuitry shown in FIG. 2 upon a power loss condition.

FIG. 4 shows the circuit of FIG. 2, but with the FETs modelled by switches in their proper position upon indication from indication circuit 60 of a loss of power condition. FETs 32, 33, 34, and 36, since they are off, are modelled by open switches. FETs 37 and 38, since they are on, are modelled by closed switches. Note that since FETs 37 and 38 are closed switches, diodes 47 and 48 present in FIG. 2 are not part of the modelled circuit of FIG. 4.

FIG. 4 also shows +V as 0 volts, indicative of the power loss condition. Capacitors 53 and 54, previously charged in their role in the LC filter circuit when power was on, are forbidden from discharging to ground through reverse biased diode 52. Instead, capacitors 53 and 54 discharge through line 51, thereby providing an energization signal to retract circuit 90, and the heads begin to retract back to the head landing area.

Note that line 14 coming from phase A of motor 10 is connected to diodes 42 and 46. The positive back-EMF generated from phase A of motor 10 is forbidden by reverse biased diode 46 from discharging to ground. Instead, when the voltage of the discharging capacitors 53 and 54 drops one diode drop below the voltage on line 14, the voltage on line 14 goes through diode 42 and recharges capacitors 53 and 54. This recharging of capacitors 53 and 54 allows power to go to retract circuit 90 via line 51 for a period of time much longer than would have been possible with just capacitors 53 and 54 alone. This extended period of time ensures that retract circuit 90 has ample power to retract the head to the head landing area (even if the head was rapidly accelerating outwardly just before the power loss), hold the head at the landing area, and latch the head into place. Line 14 continues to recharge capacitors 53 and 54 as long as it has enough voltage to forward bias diode 42.

Lines 15 and 16, coming from phases B and C respectively of motor 10, are both connected to shorting resistor 39 upon loss of power, as shown in FIG. 4. Therefore, simultaneously with phase A generating power to recharge capacitors 53 and 54 to retract the head, phases B and C are shorted and regeneratively brake motor 10. Note also that the negative back-EMF from phase A goes through diode 46 and assists the regenerative braking process. Therefore, 5/6 of the motor is used for braking, and 1/6 is used to generate power for the retract circuit.

Figure 5:
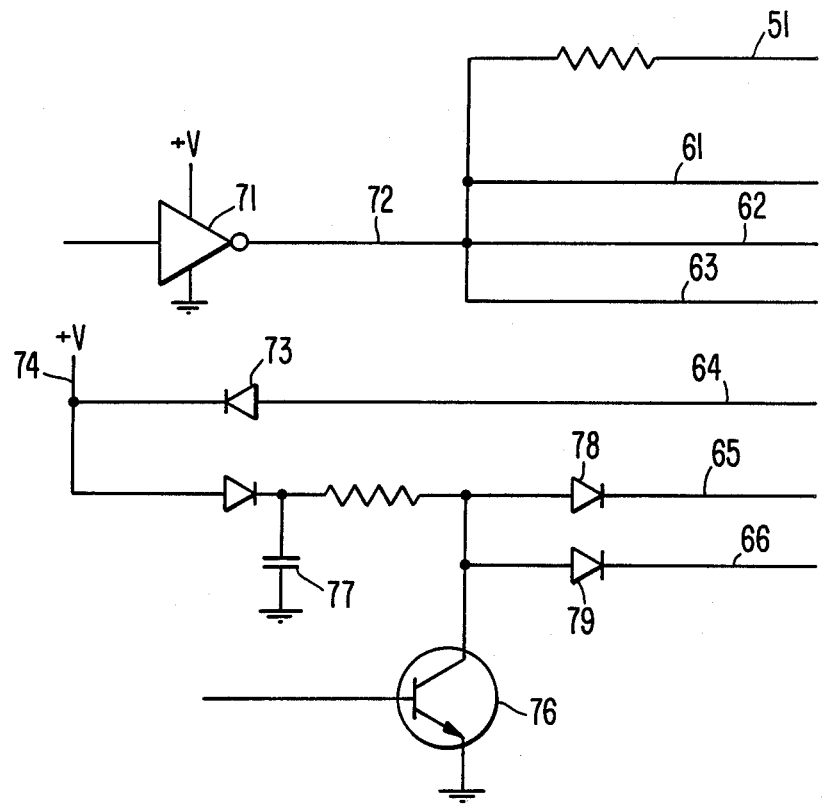
FIG. 5 shows detailed circuitry of the power indication circuit.

FIG. 5 shows how power indication circuit 60 holds lines 61, 62, 63, 65, and 66 high while holding line 64 low upon indication of power loss. Power to inverter 71 is lost during power down, thereby turning off inverter 71. The output of the inverter, line 72, is then pulled up to the voltage of line 51 coming from capacitors 53 and 54 (FIG. 2), thereby holding lines 61, 62, and 63 high.

Line 64 is pulled low through diode 73 when voltage on line 74 drops to 0 volts due to a loss of power. Transistor 76, normally switched on when power is on, is turned off upon the loss of power, thereby allowing capacitor 77 to discharge through diodes 78 and 79 to lines 65 and 66, thereby holding lines 65 and 66 high.

Figure 6:
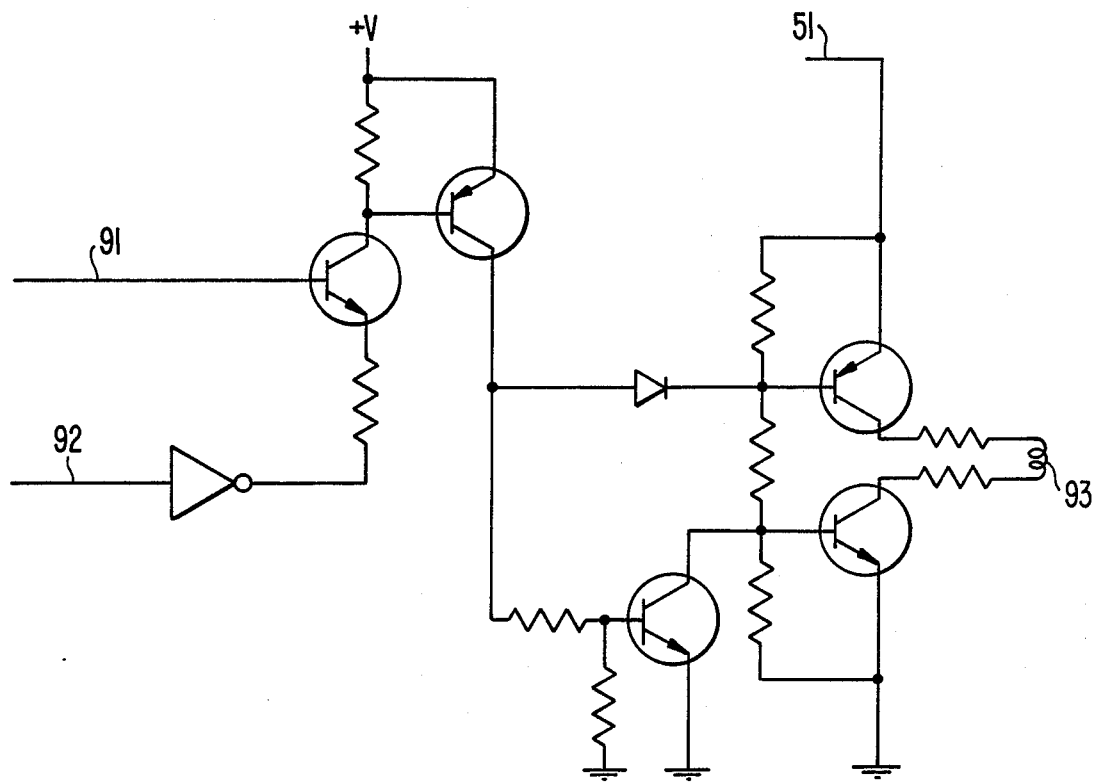
FIG. 6 shows detailed circuitry of the head retract circuit.

FIG. 6 shows retract circuit 90 in more detail. Line 91 drops on power loss to turn on the retract circuit. Line 92 holds the retract circuit on until the servo system is ready. When the retract circuit is on, power from line 51 energizes actuator coil 93, thus retracting the head.

While the invention has been described with respect to a preferred embodiment thereof, it will be understood by those skilled in the art that various changes in detail may be made therein without departing from the spirit, scope, and teaching of the invention. For example, different motors other than that shown in the preferred embodiment may be used. The invention could also be used to control other circuitry with power down retracting and braking requirements. In addition, the circuitry shown throughout may be implemented in other equivalent ways. Accordingly, the herein disclosed is to be limited only as specified in the following claims.

What is claimed is:

1. A method of retracting a head assembly of a disk drive and of braking a multi-phase spindle motor of said disk drive upon loss of power to said disk drive, comprising the steps of:
   detecting the loss of power to said disk drive;
   generating power with one phase of said multi-phase spindle motor to retract said head assembly; and
   simultaneously shorting the remaining phases of said multi-phase motor to regeneratively brake said multi-phase motor.

2. The method of claim 1, further comprising the step of:
   storing power in a storage circuit to retract said head assembly; and
   using said generated power to recharge said storage circuit.

3. An apparatus for retracting a head assembly of a disk drive and for braking a multi-phase spindle motor of said disk drive upon loss of power to said disk drive, said apparatus comprising:
   head retract means, connected to said head assembly of said disk drive, for retracting said head responsive to an energization signal;
   control means, connected to said motor, for driving said motor upon indication of the presence of power, and for generating said energization signal for said head retract means and for braking said motor upon indication of the loss of power, said generating and said braking occurring simultaneously;
   indication means, connected to said control means, for indicating the presence and loss of power; and
   storage means, connected to said control means and said head retract means, for storing said energization signal from said control means.

4. The apparatus of claim 3, wherein said control means comprises:
   a first plurality of switching devices each having a first, second and third input, said first inputs connected to said indication means, said second inputs connected to said motor, said third inputs connected to said storage means; and
   a second plurality of switching devices each having a first, second and third input, said first inputs connected to said indication means, said second inputs connected to said motor, said third inputs connected to a substantially grounded signal level.

5. The apparatus of claim 4, wherein said first plurality of switching devices, upon indication of power on from said indication means, sequentially switch on and off to provide sequential power to each phase of said multi-phase motor, thereby producing rotational motion of said motor.

6. The apparatus of claim 4, wherein one of said first plurality of switching devices is held on upon indication of loss of power from said indication means, thereby providing an electrical path between a first phase of said motor to said storage means for said energization signal.

7. The apparatus of claim 4, wherein said second plurality of switching devices, upon indication of power on from said indication means, sequentially switch on and off to provide speed control information to said multi-phase motor.

8. The apparatus of claim 4, wherein at least two of said second plurality of switching devices are held on upon indication of loss of power from said indication means, thereby shorting out all phases except said first phase of said motor, thereby regeneratively braking said motor.

9. The apparatus of claim 3, wherein said storage means comprises a filter having a capacitor and an inductor.

10. The apparatus of claim 9, wherein said capacitor provides said energization signal to said retract means upon indication of power loss and is recharged by said first phase of said motor.

11. The apparatus of claim 5, wherein said storage means comprises a filter having a capacitor and an inductor.

12. The apparatus of claim 11, wherein said filter filters said sequential power upon indication of power on from said indicating means.

13. A disk drive circuit having a head assembly, comprising:
   a spindle motor having three phases;
   a first plurality of switching devices, connected to said spindle motor;
   a second plurality of switching devices, connected to said spindle motor;
   a filter, connected to said first plurality of switching devices;
   power indication means, connected to said first and second plurality of switching devices;

head retract means, connected to said filter, for retracting said head responsive to an energization signal;

said first plurality of switching devices, upon indication of power on from said indication means, sequentially switching on and off to provide sequential power to each phase of said motor, thereby producing rotational motion of said motor, wherein one of said first plurality of switching devices is held on upon indication of loss of power from said indication means, thereby providing an electrical path between a first phase of said motor to said filter for said energization signal to energize said head retract means; and said second plurality of switching devices upon, indication of power on from said indication means, sequentially switching on and off to provide speed control information to said motor, wherein at least two of said second plurality of switching devices are held on upon indication of loss of power from said indication means, thereby shorting out all phases except said first phase of said motor to regeneratively brake said motor.

* * * * *